(12) United States Patent
Kumar et al.

(10) Patent No.: US 11,816,462 B2
(45) Date of Patent: Nov. 14, 2023

(54) COPY MANAGEMENT FOR CONTAINER-BASED APPLICATIONS

(71) Applicant: EMC IP Holding Company LLC, Hopkinton, MA (US)

(72) Inventors: Sunil Kumar, Bangalore (IN); Anil Arun Degwekar, Bangalore (IN); Thomas L. Watson, Richardson, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 395 days.

(21) Appl. No.: 17/210,779

(22) Filed: Mar. 24, 2021

(65) Prior Publication Data

US 2022/0308849 A1 Sep. 29, 2022

(51) Int. Cl.
*G06F 11/14* (2006.01)
*G06F 8/60* (2018.01)

(52) U.S. Cl.
CPC ............ *G06F 8/60* (2013.01); *G06F 11/1448* (2013.01); *G06F 2201/84* (2013.01)

(58) Field of Classification Search
None
See application file for complete search history.

(56) References Cited

U.S. PATENT DOCUMENTS

2022/0207053 A1* 6/2022 Mankad ................. H04L 67/30
2022/0284000 A1* 9/2022 Ramasamy .......... G06F 11/1456

OTHER PUBLICATIONS

G. Saenger et al., "Pod Safety, Consistency Guarantees, and Storage Implications," https://github.com/kubernetes/community/blob/master/contributors/design-proposals/storage/pod-safety.md, Oct. 2016, 10 pages.
N. Yehia, "Kubernetes Self Remediation (AKA Poison Pill)," https://www.openshift.com/blog/kubernetes-self-remediation-aka-poison-pill, Nov. 18, 2020, 4 pages.
N. Yehia, "Poison Pill k8s Node Remediation," https://github.com/poison-pill/poison-pill, Dec. 30, 2020, 2 pages.
Github, "HPE CSI Driver for Kubernetes," https://github.com/hpe-storage/csi-driver, accessed Feb. 4, 2021, 3 pages.
Github, "Stork—Storage Operator Runtime for Kubernetes," https://github.com/libopenstorage/stork, accessed Feb. 4, 2021, 8 pages.

* cited by examiner

*Primary Examiner* — Craig C Dorais
(74) *Attorney, Agent, or Firm* — Ryan, Mason & Lewis, LLP

(57) ABSTRACT

Techniques for application copy management in container environments are disclosed. For example, a method obtains a copy of an application program, wherein the copy of the application program is a copy generated for a first cluster of a container-based information processing system within which the application program is deployed. The method then utilizes the copy of the application program from the first cluster to deploy the application program in a second cluster of the container-based information processing system.

20 Claims, 9 Drawing Sheets

380 | `bash$ velero backup create <backup_name> --storage-location <location in object store to save backup> --include-namespaces <namespace to backup> --exclude-resources='volumesnapshots,volumesnapshotcontents'`

FIG. 3C

382 | `bash$ kubectl exec <pod name> -n <name space name> -- sh -c 'freeze cmd'`

FIG. 3D

384 | `bash$ velero restore create --from-backup <backup_name> --namespace-mappings <old ns name>:<new ns name> --include-resources='namespaces,services'`

FIG. 3E

386 | `bash$ kubectl get volumesnapshotcontent "kubectl get volumesnapshot -n <namespace> -o jsonpath="{.items[0].status.boundVolumeSnapshotContentName}"" -o jsonpath="{.spec.volumeSnapshotRef.name}"`

FIG. 3F

```
apiVersion: snapshot.storage.k8s.io/v1beta1
kind: VolumeSnapshotContent
metadata:
  name: <snapcontent-name>
spec:
  deletionPolicy: Delete
  driver: csi-unity.dellemc.com
  volumeSnapshotClassName: <snapclass-name>
  source:
    snapshotHandle: <snaphandle name>
  volumeSnapshotRef:
    name: <snap-name>
    namespace: <new namespace>
---
apiVersion: snapshot.storage.k8s.io/v1beta1
kind: VolumeSnapshot
metadata:
  name: <snap-name>
  namespace: <new namespace>
spec:
  volumeSnapshotClassName: <snapclass-name>
  source:
    volumeSnapshotContentName: <snapcontent-name>
```

```
apiVersion: v1
kind: PersistentVolumeClaim
metadata:
  name: <claim name>
  namespace: <new namespace>
spec:
  storageClassName: <sc name>
  dataSource:
    name: <snap-name>
    kind: VolumeSnapshot
    apiGroup: snapshot.storage.k8s.io
  accessModes:
    - ReadWriteOnce
  resources:
    requests:
      storage: <capacity>
```

```
bash$ velero restore create --from-backup engg-backup7 --namespace-mappings engg:devengg
--exclude-resources=PersistentVolumeClaims,PersistentVolumes
```

COPY MANAGEMENT FOR CONTAINER-BASED APPLICATIONS

FIELD

The field relates generally to information processing systems, and more particularly to management of container environments.

BACKGROUND

Information processing systems increasingly utilize reconfigurable virtual resources to meet changing user needs in an efficient, flexible and cost-effective manner. For example, cloud-based computing and storage systems implemented using virtual resources in the form of containers have been widely adopted. Such containers may be used to provide at least a portion of the virtualization infrastructure of a given information processing system. However, significant challenges arise in managing container environments especially in the case of application mobility in the container environment.

SUMMARY

Illustrative embodiments provide techniques for application copy management in container environments.

For example, in an illustrative embodiment, a method comprises the following steps. The method obtains a copy of an application program, wherein the copy of the application program is a copy generated for a first cluster of a container-based information processing system within which the application program is deployed. The method then utilizes the copy of the application program from the first cluster to deploy the application program in a second cluster of the container-based information processing system.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments enable, inter alia, efficient, flexible and cost-effective solutions for application mobility from one part (e.g., a cluster) of a container environment to another part (e.g., another cluster) of the container environment. More particularly, illustrative embodiments enable a local snapshot to be used on a different cluster to recover the application. By way of example only, this approach provides a fast and space efficient mechanism to get a copy of a production application running in a first cluster deployed in a second cluster for test/development and/or analytics workload purposes.

While such container management techniques are particularly effective in pod-based container environments, it is to be appreciated that the techniques can be implemented in other container environments.

These and other illustrative embodiments include, without limitation, apparatus, systems, methods and computer program products comprising processor-readable storage media.

BRIEF DESCRIPTION OF THE DRAWINGS

FIGS. 3C through 3I illustrate examples of software code used to implement at least a portion of steps of an application copy management methodology in a pod-based container environment according to an illustrative embodiment.

DETAILED DESCRIPTION

Figure 1:
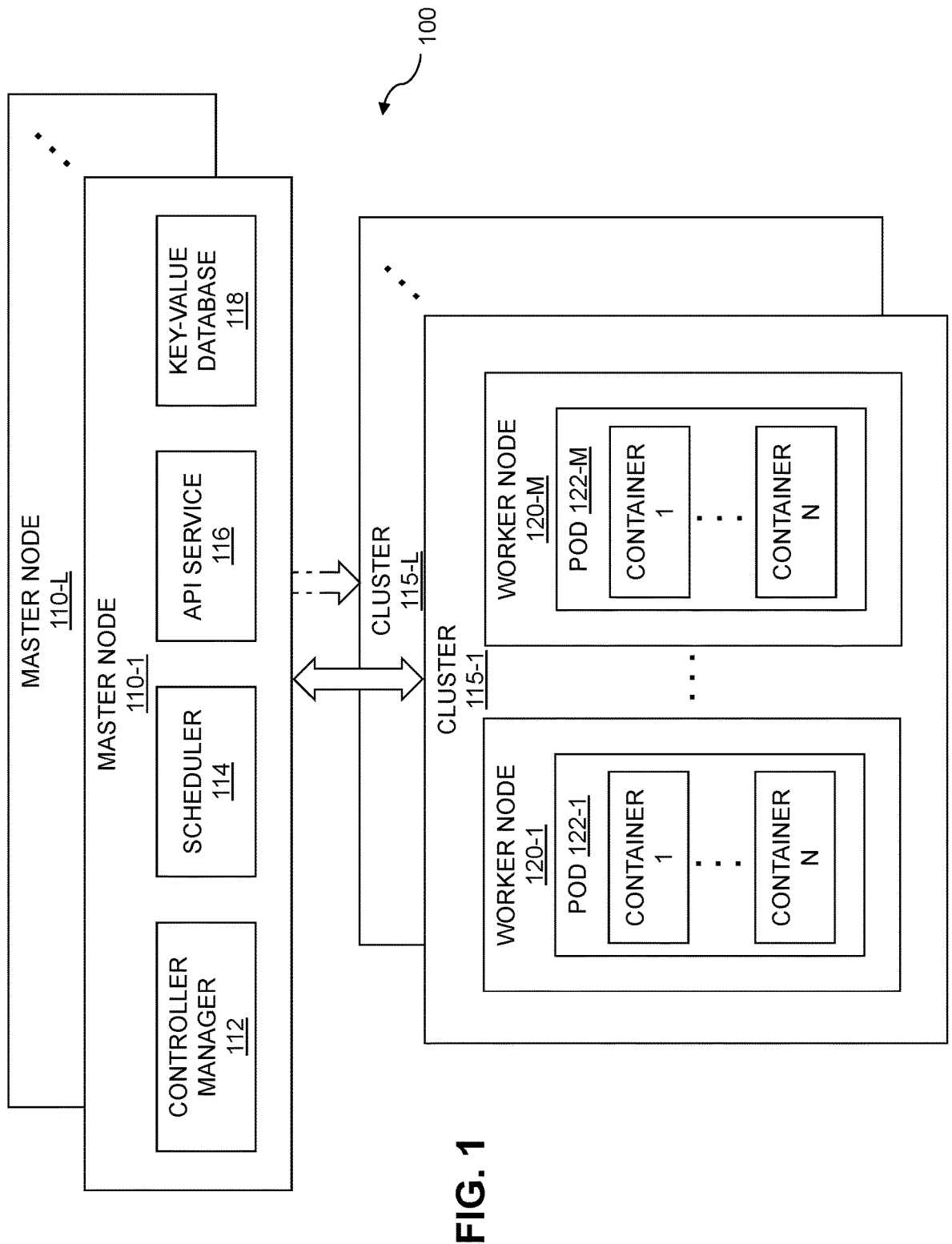
FIG. 1 illustrates a pod-based container environment within which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources.

As the term is illustratively used herein, a container may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based information processing system comprised of components referred to as pods, nodes and clusters, as will be further explained below in the context of FIG. 1. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy its application programs (applications). By way of example only, such applications may include stateless (or inherently redundant applications) and/or stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by a least one master node. A Kubernetes environment may include multiple clusters respectively managed by multiple master nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

FIG. 1 depicts an example of a pod-based container orchestration environment 100. As shown, a plurality of master nodes 110-1, . . . 110-L (herein each individually referred to as master node 110 or collectively as master nodes 110) are respectively operatively coupled to a plurality of clusters 115-1, . . . 115-L (herein each individually referred to as clusters 115 or collectively as clusters 115). As mentioned above, each cluster is managed by at least one master node. Illustrative embodiments provide for application copy management across multiple clusters (e.g., from one cluster of clusters 115 to another cluster of clusters 115), as will be further explained in detail herein.

Each cluster 115 comprises a plurality of worker nodes 120-1, . . . 120-M (herein each individually referred to as worker node 120 or collectively as worker nodes 120). Each worker node 120 comprises a respective pod, i.e., one of a plurality of pods 122-1, . . . 122-M (herein each individually referred to as pod 122 or collectively as pods 122). However, it is to be understood that one or more worker nodes 120 can run multiple pods 122 at a time. Each pod 122 comprises a set of containers 1, . . . N (each pod may also have a different number of containers). As used herein, a pod may be referred to more generally as a containerized workload. Also shown in FIG. 1, each master node 110 comprises a controller manager 112, a scheduler 114, an application programming interface (API) service 116, and a key-value database 118, as will be further explained. However, in some embodiments, multiple master nodes 110 may share one or more of the same controller manager 112, scheduler 114, API service 116, and key-value database 118.

Worker nodes 120 of each cluster 115 execute one or more applications associated with pods 122 (containerized workloads). Each master node 110 manages the worker nodes 120, and therefore pods 122 and containers, in its corresponding cluster 115. More particularly, each master node 110 controls operations in its corresponding cluster 115 utilizing the above-mentioned components, i.e., controller manager 112, scheduler 114, API service 116, and a key-value database 118. In general, controller manager 112 executes control processes (controllers) that are used to manage operations in cluster 115. Scheduler 114 typically schedules pods to run on particular nodes taking into account node resources and application execution requirements such as, but not limited to, deadlines. In general, in a Kubernetes implementation, API service 116 exposes the Kubernetes API, which is the front end of the Kubernetes container orchestration system. Key-value database 118 typically provides key-value storage for all cluster data including, but not limited to, configuration data objects generated, modified, deleted, and otherwise managed, during the course of system operations.

Figure 2:
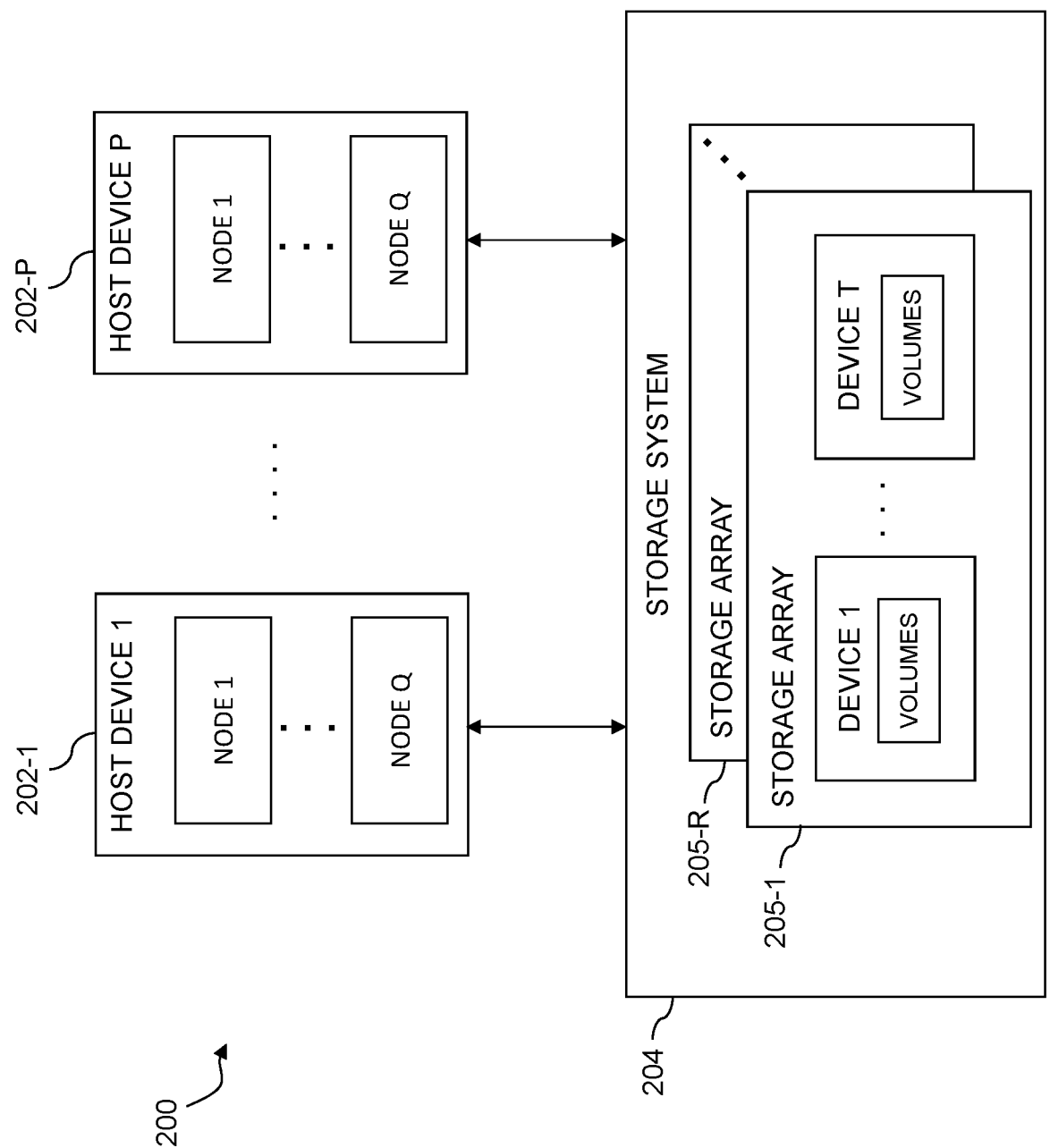
FIG. 2 illustrates host devices and a storage system within which one or more illustrative embodiments can be implemented.

Turning now to FIG. 2, an information processing system 200 is depicted within which pod-based container orchestration environment 100 of FIG. 1 can be implemented. More particularly, as shown in FIG. 2, a plurality of host devices 202-1, . . . 202-P (herein each individually referred to as host device 202 or collectively as host devices 202) are operatively coupled to a storage system 204. Each host device 202 hosts a set of nodes 1, . . . Q. Note that while multiple nodes are illustrated on each host device 202, a host device 202 can host a single node, and one or more host devices 202 can host a different number of nodes as compared with one or more other host devices 202.

As further shown in FIG. 2, storage system 204 comprises a plurality of storage arrays 205-1, . . . 205-R (herein each individually referred to as storage array 205 or collectively as storage arrays 205), each of which is comprised of a set of storage devices 1, T upon which one or more storage volumes are persisted. The storage volumes depicted in the storage devices of each storage array 205 can include any data generated in the information processing system 200 but, more typically, include data generated, manipulated, or otherwise accessed, during the execution of one or more applications in the nodes of host devices 202.

Furthermore, any one of nodes 1, . . . Q on a given host device 202 can be a master node 110 or a worker node 120 (FIG. 1). In some embodiments, a node can be configured as a master node for one execution environment and as a worker node for another execution environment. Thus, the components of pod-based container orchestration environment 100 in FIG. 1 can be implemented on one or more of host devices 202, such that data associated with pods 122 (FIG. 1) running on the nodes 1, . . . Q is stored as persistent storage volumes in one or more of the storage devices 1, . . . T of one or more of storage arrays 205.

Host devices 202 and storage system 204 of information processing system 200 are assumed to be implemented using at least one processing platform comprising one or more processing devices each having a processor coupled to a memory. Such processing devices can illustratively include particular arrangements of compute, storage and network resources. In some alternative embodiments, one or more host devices 202 and storage system 204 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of information processing system 200 are possible, in which certain components of the system reside in one data center in a first geographic location while other components of the system reside in one or more other data centers in one or more other geographic locations that are potentially remote from the first geographic location. Thus, it is possible in some implementations of information processing system 200 for portions or components thereof to reside in different data centers. Numerous other distributed implementations of information processing system 200 are possible. Accordingly, the constituent parts of information processing system 200 can also be implemented in a distributed manner across multiple computing platforms.

Additional examples of processing platforms utilized to implement containers, container environments and container management systems in illustrative embodiments, such as those depicted in FIGS. 1 and 2, will be described in more detail below in conjunction with FIGS. 4 and 5.

It is to be appreciated that these and other features of illustrative embodiments are presented by way of example only, and should not be construed as limiting in any way.

Accordingly, different numbers, types and arrangements of system components can be used in other embodiments. Although FIG. 2 shows an arrangement wherein host devices 202 are coupled to just one plurality of storage arrays 205, in other embodiments, host devices 202 may be coupled to and configured for operation with storage arrays across multiple storage systems similar to storage system 204.

It should be understood that the particular sets of components implemented in information processing system 200 as illustrated in FIG. 2 are presented by way of example only. In other embodiments, only subsets of these components, or additional or alternative sets of components, may be used, and such components may exhibit alternative functionality and configurations. Additional examples of systems implementing pod-based container management functionality will be described below.

Still further, information processing system 200 may be part of a public cloud infrastructure such as, but not limited to, Amazon Web Services (AWS), Google Cloud Platform (GCP), Microsoft Azure, etc. The cloud infrastructure may also include one or more private clouds and/or one or more hybrid clouds (e.g., a hybrid cloud is a combination of one or more private clouds and one or more public clouds).

It is realized herein that within container orchestration environments, such as the pod-based environment of Kubernetes, stateful applications are deployed on top of persistent volumes which are typically provisioned by container storage interface (CSI) drivers (driver plugins) of respective external storage system vendors (e.g. one or more third-party providers of components of storage system 204). A CSI driver plugin is typically deployed in Kubernetes as two components: a controller component and a per-node component. The controller component can be deployed on any node (e.g., master node 110 or worker node 120) and implements a CSI controller service and one or more sidecar containers. Controller sidecar containers typically interact with Kubernetes objects and make calls to the CSI controller service. Controller sidecars typically include an external-provisioner, an external-attacher, an external-snapshotter, and an external-resizer. Sidecar containers manage Kubernetes events and make the appropriate calls to the CSI driver. The node component is typically deployed on every node (e.g., master nodes 110 and worker nodes 120) and implements a CSI node service and a node-driver-registrar sidecar container.

Despite the flexibility of the illustrative architecture described above, existing Kubernetes environments have challenges with respect to application copy management and, in particular, application copy mobility. By way of example, it is realized herein that existing Kubernetes environments do not provide any solution to create a local copy of pods (e.g., running a production or online application) and recover the application to a different Kubernetes cluster using space efficient local snapshots of the underlying storage snapshots. It is further realized herein that this limitation is at least in part due to Kubernetes CSI specifications that dictate that a local snapshot be created in the same namespace as the production persistent volumes, and thus the local snapshot cannot be moved to another namespace or cluster without copying the entire snapshot which is a very costly and time-consuming operation. Kubernetes supports multiple virtual clusters which can be backed by the same physical cluster or multiple physical clusters. These virtual clusters are called namespaces which provide a scope for names, i.e., names of resources need to be unique within a namespace, but not between namespaces. Further, namespaces provide a mechanism to divide cluster resources between multiple users.

Illustrative embodiments provide solutions to this and other drawbacks associated with Kubernetes and other pod-based environments. By way of example only, such solutions are very much needed for secondary workloads such as, but not limited to, backup, test/dev, reporting and analytics, as using production deployment pods is not preferred as it may impact quality-of-service (QoS) of the production application.

For example, illustrative embodiments provide an application copy mobility solution using a storage system local snapshot to meet the requirements for use cases such as, but not limited to, the secondary workloads mentioned above. More particularly, illustrative embodiments enable a local snapshot to be used on a different cluster to recover an application. The solution, advantageously, provides a very fast and space efficient mechanism to obtain a copy of a production application deployed in a Kubernetes environment for secondary workloads such as test/dev and analytics workloads.

Figure 3A:
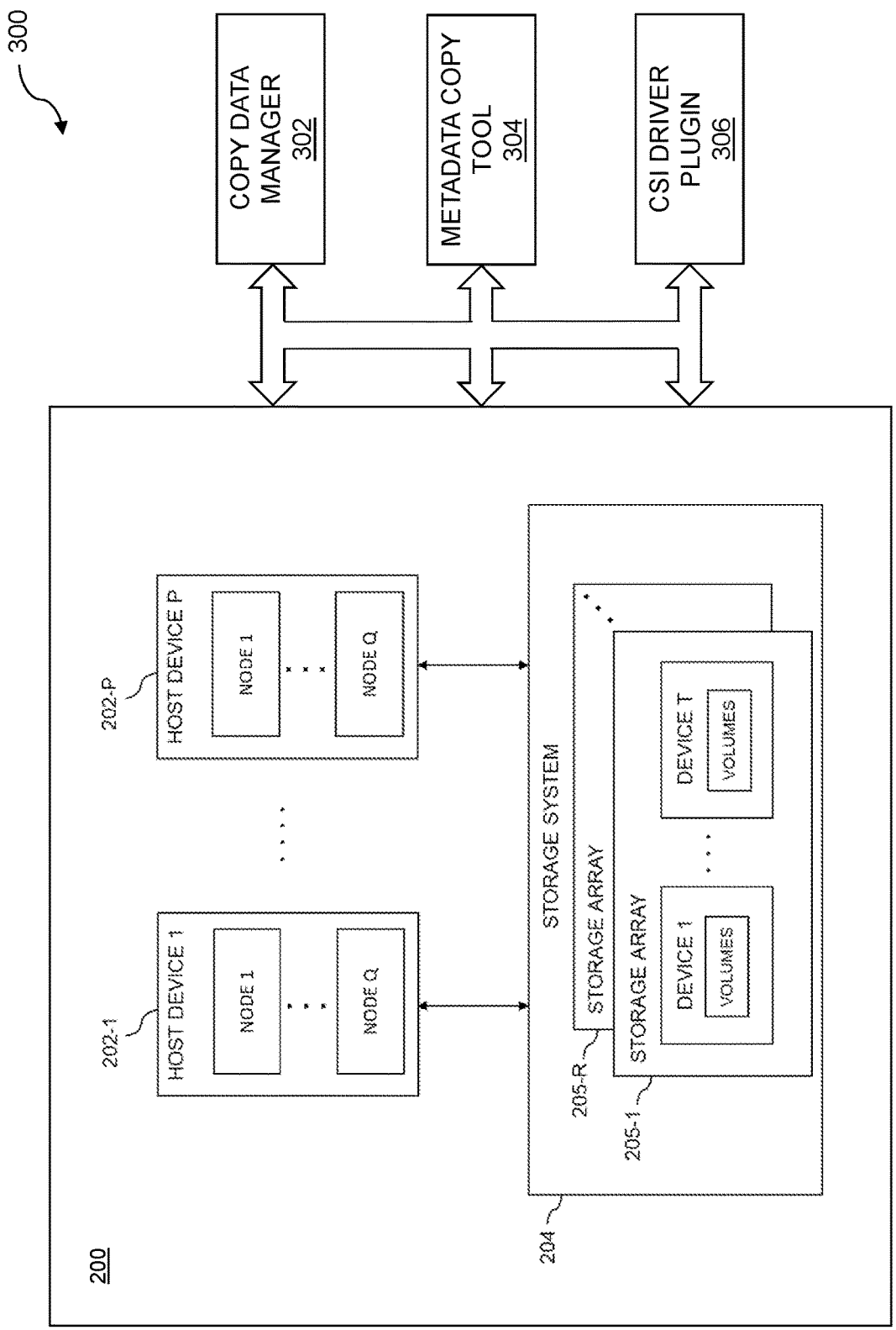
FIG. 3A illustrates application copy management functionalities in a pod-based container environment according to an illustrative embodiment.

Turning now to FIG. 3A, application copy management functionalities in a pod-based container environment 300 are depicted according to an illustrative embodiment. As shown, a set of components comprising a copy data manager 302, a metadata copy tool 304, and a CSI driver plugin 306 are operatively coupled to one another and to information processing system 200 (described above in the context of FIG. 2). Note that while copy data manager 302, metadata copy tool 304, and CSI driver plugin 306 are depicted as separate from information processing system 200 for ease of explanation, copy data manager 302, metadata copy tool 304, and CSI driver plugin 306 may be implemented within information processing system 200 (i.e., one or more nodes, one or more host devices 202, one or more storage arrays 205, storage system 204, etc.) in some embodiments. However, in alternative embodiments, copy data manager 302, metadata copy tool 304, and CSI driver plugin 306 may be implemented in processing and/or storage elements outside of information processing system 200. Still further, in other embodiments, one or more of copy data manager 302, metadata copy tool 304, and CSI driver plugin 306 may be implemented within information processing system 200, while one or more others of copy data manager 302, metadata copy tool 304, and CSI driver plugin 306 may be implemented outside information processing system 200.

Copy data manager 302 is configured as an application-aware copy data management (CDM) tool. By way of example only, in one or more illustrative embodiments, copy data manager 302 may comprise and/or adapt a commercially available CDM tool such as AppSync (available from Dell Technologies Inc. of Hopkinton, MA). However, embodiments of copy data manager 302 may be configured as described herein independent of any commercially available CDM tool.

Metadata copy tool 304 is configured to copy deployed stateful application metadata at any point in time. By way of example only, in one or more illustrative embodiments, metadata copy tool 304 may comprise and/or adapt a commercially available backup toolkit such as Velero (available from VMware Inc. of Palo Alto, CA). However, embodiments of metadata copy tool 304 may be configured as described herein independent of any commercially available backup toolkit.

CSI driver plugin 306, in some illustrative embodiments, is configured as mentioned above, i.e., to provision persistent storage volumes for stateful applications deployed on top of the persistent volumes. CSI driver plugin 306, in a Kubernetes environment, may have a controller component and a per-node component as described above.

Figure 3B:
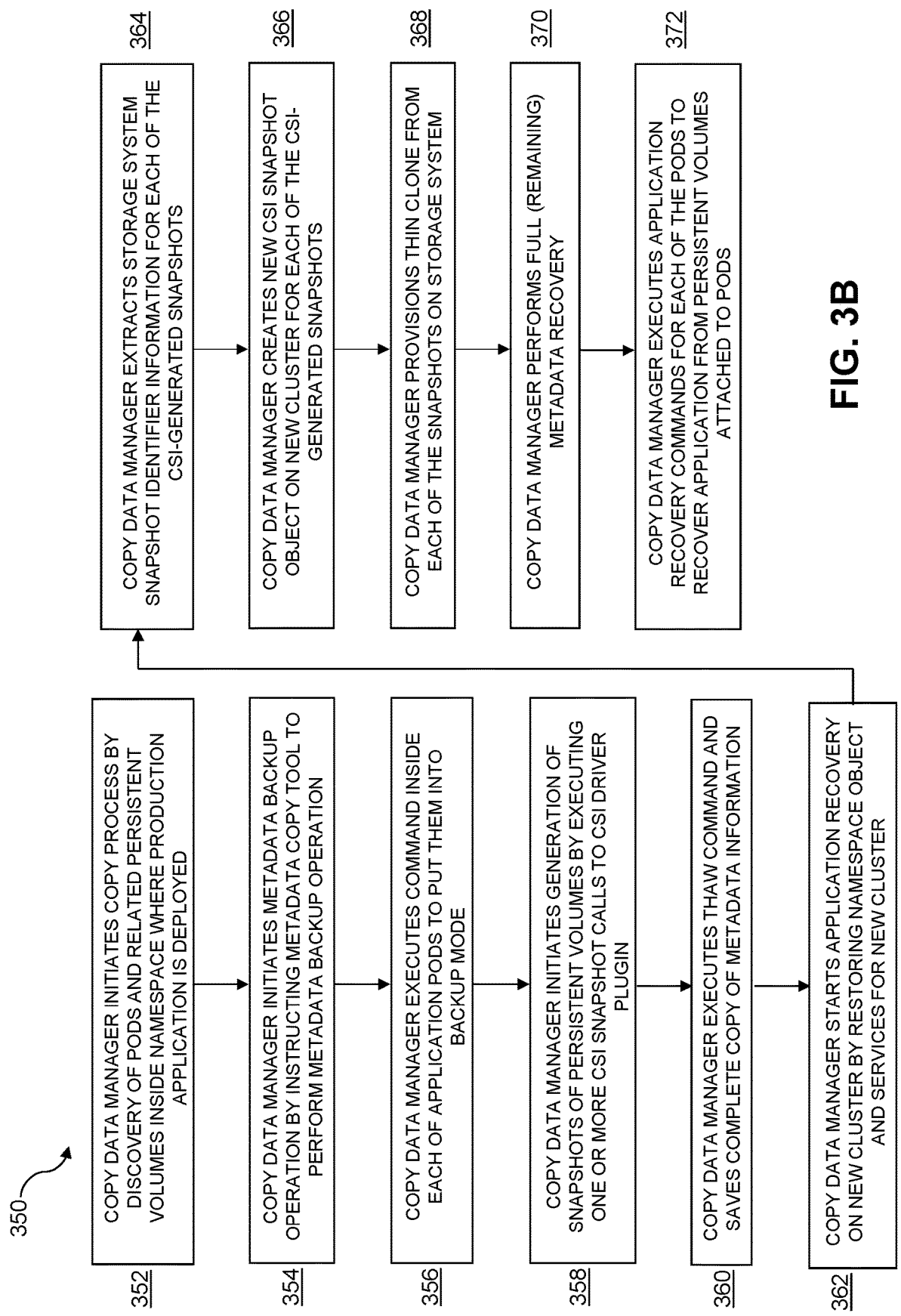
FIG. 3B illustrates an application copy management methodology in a pod-based container environment according to an illustrative embodiment.

The above and other functionalities of copy data manager 302, metadata copy tool 304, and CSI driver plugin 306 will be described in detail below in the context of FIGS. 3B through 3I. More particularly, FIG. 3B illustrates an application copy management methodology 350 executable in a pod-based container environment (e.g., information processing system 200) with copy data manager 302, metadata copy tool 304, and CSI driver plugin 306 according to an illustrative embodiment. FIGS. 3C through 3I illustrate examples of software code and/or commands 380 through 392 used to implement at least a portion of the steps of application copy management methodology 350 of FIG. 3B. As will be further explained in detail below, application copy management methodology 350 utilizes one or more snapshots (copies) taken of an application deployed in a first cluster (e.g., one of clusters 115 in FIG. 1) to recover/move (deploy) the application in/to (on) at least a second cluster (e.g., at least one of the other clusters 115 in FIG. 1).

In step 352, copy data manager 302 initiates the copy process by discovery of pods and related persistent volumes inside the namespace where the production application of interest is deployed. In one illustrative embodiment, copy data manager 302 queries API service 116 (master node 110 of FIG. 1) to obtain this information.

Once the discovery is completed, copy data manager 302 initiates a metadata backup operation, in step 354, by instructing metadata copy tool 304 to perform the metadata backup operation by generating a copy of metadata including, for example, the namespace configuration files, secrets, services, etc. In illustrative embodiments, metadata copy tool 304 is used to generate the metadata backup but does not necessarily access the persistent volumes or application running inside the pods of interest. In some embodiments, the metadata backup can be stored in an object storage which is accessible over a network operatively coupled to metadata copy tool 304. The object store can be part of information processing system 200 and/or an object store remote from information processing system 200. By way of example only, any S3 compatible object store can be employed. In one example, sample executable code 380 in FIG. 3C may be used by copy data manager 302 to trigger this metadata backup operation performed by metadata copy tool 304. In an alternative embodiment, the same command can be triggered via Kubernetes REST API.

In step 356, copy data manager 302 executes a freeze command inside each of the application pods to put the applications into a backup mode (e.g., application 10 operations are halted or quiesced). This is done to make sure that, before generating the copy of persistent data volumes, applications are in an appropriate state to support an application consistent backup. Sample executable code to perform this step is shown in FIG. 3D as command 382. In an alternative embodiment, the same command can be triggered via Kubernetes REST API.

Once application pods are put into a consistent state for backup, in step 358, copy data manager 302 initiates generation of snapshots of the persistent volumes by executing one or more CSI snapshot calls to CSI driver plugin 306 which performs or otherwise manages generation of the snapshots (copies).

In step 360, quiesced applications inside the pods (halted in step 356) are thawed (un-halted) by executing a thaw command inside each of the pods. That is, the applications are taken out of the backup mode. After the thaw command is executed, operations on the production cluster are marked completed. Copy data manager 302 saves metadata specific to the volume snapshot inside its persistence state. More particularly, this step preserves the complete copy of metadata information (metadata from step 354 and step 360) for the application copy process.

In step 362, copy data manager 302 starts application recovery on a new Kubernetes cluster (target cluster for copy reuse) by first invoking a partial metadata restore, for example, restoring for the new cluster at least a part of the metadata backup created in step 354 above. By way of example, this includes restoring the namespace object (with a choice to keep the same name or a different name) and services inside the namespace. Sample executable code to perform this step is shown in FIG. 3E as command 384.

In step 364, copy data manager 302 extracts storage system snapshot identifier information for each of the CSI-generated snapshots (generated in step 358). In an illustrative embodiment, this step can be performed by reading the ".spec.volumeSnapshotRef.name" field of the associated volumesnapshotcontent with every volumesnapshot. This step is repeated for each snapshot created in step 358 above. Sample executable code to perform this step is shown in FIG. 3F as kubectl command 386.

In step 366, using the storage system snapshot identifier obtained in step 364 above, copy data manager 302 creates a new CSI snapshot object on the new Kubernetes cluster by ingesting the snapshot information. For example, the new CSI snapshot object is created for a pod (containerized workload) of a node in the new cluster (e.g., implemented on one or more of host devices 202 in FIG. 2). In an illustrative embodiment, this step can be done by first creating a volumesnapshotcontent object by ingestion and then provisioning a new CSI snapshot object from the volumesnapshotcontent. This step is repeated for each set of snapshot information obtained in step 364. Sample executable code to perform this operation is shown in FIG. 3G as yaml code 388.

In step 368, using the snapshot object ingested in step 366 above, copy data manager 302 creates a PersistentVolumeClaim request for each of the ingested snapshots (VolumeSnapshot). This step internally provisions a thin clone from each of the snapshots on the storage system (e.g., one or more storage arrays 205 of storage system 204 in FIG. 2) and is a suitable copy which is used for performing all test/dev and copy reuse workloads as well running the primary workload operation. Sample executable code to perform this operation is shown in FIG. 3H as yaml code 390, i.e., yaml code 390 provisions a PersistentVolumeClaim from a VolumeSnapshot.

In step 370, copy data manager 302 performs full metadata recovery which recovers remaining metadata including, for example, metadata for deployments, pods, stateful sets, secrets, configuration files, etc. Sample executable code to perform this operation is shown in FIG. 3I as command 392.

As explained, step 370 completes metadata and data recovery. Copy data manager 302 then waits for the pods to come up in the new cluster. Once the pods are up and running, copy data manager 302, in step 372, executes application recovery commands for each of the pods to recover the application from the persistent volumes attached to the pods. After this step, application recovery is marked as completed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for application copy management in container environments will now be described in greater detail with reference to FIGS. 4 and 5. Although described in the context of information processing system 200, these platforms may also be used to implement at least portions of other information processing systems in other embodiments.

Figure 4:
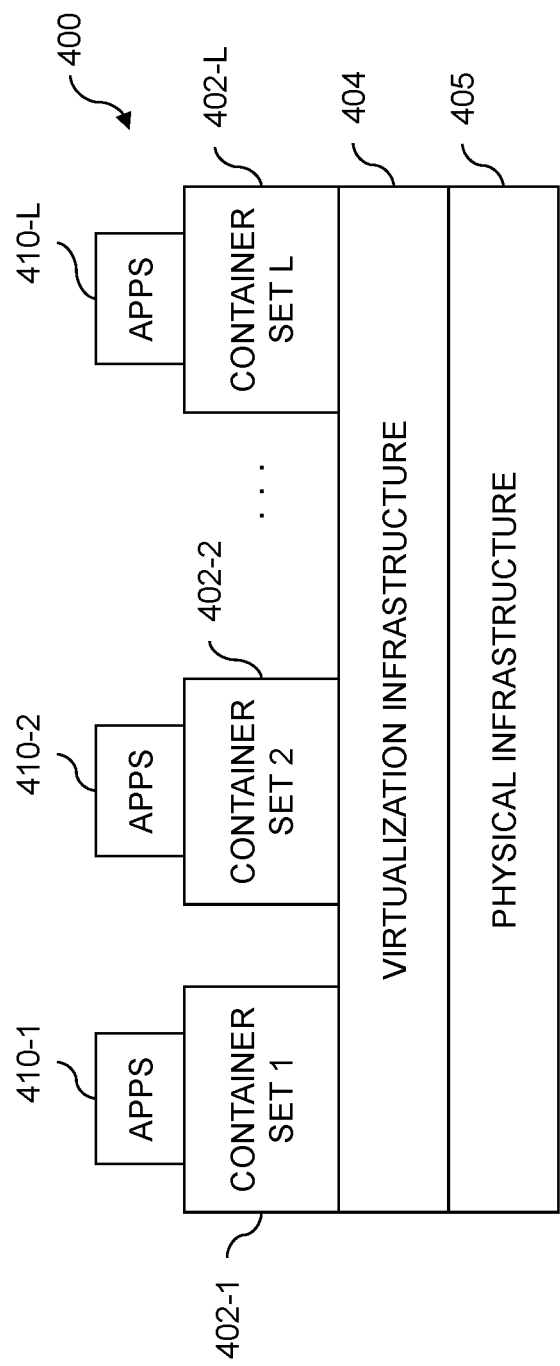
FIGS. 4 and 5 show examples of processing platforms that may be utilized to implement at least a portion of an information processing system with a pod-based container environment according to one or more illustrative embodiments.
Figure 5:
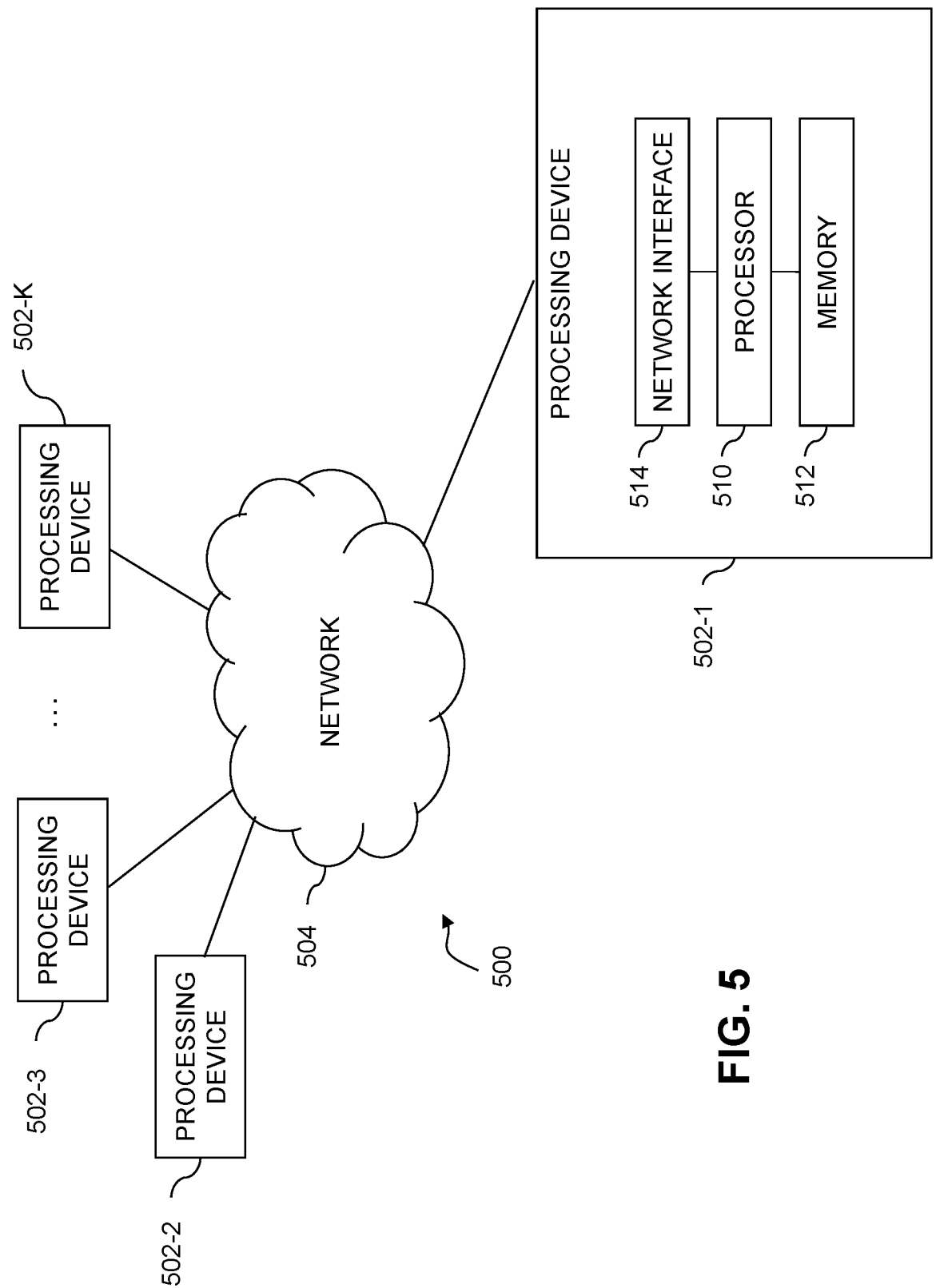

FIG. 4 shows an example processing platform comprising cloud infrastructure 400. The cloud infrastructure 400 comprises a combination of physical and virtual processing resources that may be utilized to implement at least a portion of the information processing system 200. The cloud infrastructure 400 comprises multiple container sets 402-1, 402-2, ... 402-L implemented using virtualization infrastructure 404. The virtualization infrastructure 404 runs on physical infrastructure 405, and illustratively comprises one or more hypervisors and/or operating system level virtualization infrastructure.

The cloud infrastructure 400 further comprises sets of applications 410-1, 410-2, ... 410-L running on respective ones of the container sets 402-1, 402-2, ... 402-L under the control of the virtualization infrastructure 404. The container sets 402 may comprise respective sets of one or more containers.

In some implementations of the FIG. 4 embodiment, the container sets 402 comprise respective containers implemented using virtualization infrastructure 404 that provides operating system level virtualization functionality, such as support for Kubernetes-managed containers.

As is apparent from the above, one or more of the processing modules or other components of information processing system 200 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of information processing system 200 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and information processing system 200 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity™, PowerMax™, PowerFlex' (previously ScaleIO™) or PowerStore™ storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

The particular processing operations and other system functionality described in conjunction with the diagrams described herein are presented by way of illustrative example only, and should not be construed as limiting the scope of the disclosure in any way. Alternative embodiments can use other types of processing operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising at least one processor coupled to at least one memory, the at least one processing platform, when executing program code, is configured to:
   obtain a copy of an application program, wherein the copy of the application program is a copy generated for a first cluster of a container-based information processing system within which the application program is deployed; and
   utilize the copy of the application program from the first cluster to deploy the application program in a second cluster of the container-based information processing system;
   wherein obtaining the copy of the application program further comprises:
      causing a metadata backup operation for the application program deployed in the first cluster to obtain a backup set of metadata; and
      halting operations associated with the application program deployed in the first cluster.

2. The apparatus of claim 1, wherein obtaining the copy of the application program further comprises discovering containerized workloads and persistent volumes associated with the application program deployed in the first cluster.

3. The apparatus of claim 2, wherein obtaining the copy of the application program further comprises causing generation of snapshots of the persistent volumes associated with the application program deployed in the first cluster.

4. The apparatus of claim 3, wherein obtaining the copy of the application program further comprises un-halting the operations associated with the application program deployed in the first cluster.

5. The apparatus of claim 4, wherein utilizing the copy of the application program from the first cluster to deploy the application program in the second cluster further comprises recovering at least a portion of the backup set of metadata in the second cluster.

6. The apparatus of claim 5, wherein utilizing the copy of the application program from the first cluster to deploy the application program in the second cluster further comprises creating, in the second cluster, a snapshot object for each snapshot of the generated snapshots.

7. The apparatus of claim 6, wherein utilizing the copy of the application program from the first cluster to deploy the application program in the second cluster further comprises creating, in the second cluster, a persistent volume claim for each snapshot of the generated snapshots.

8. The apparatus of claim 7, wherein utilizing the copy of the application program from the first cluster to deploy the application program in the second cluster further comprises recovering a remaining portion of the backup set of metadata in the second cluster.

9. The apparatus of claim 8, wherein utilizing the copy of the application program from the first cluster to deploy the application program in the second cluster further comprises recovering the application program from the persistent volumes attached to corresponding ones of the containerized workloads in the second cluster to enable the application program to execute in the second cluster.

10. A method comprising:
    obtaining a copy of an application program, wherein the copy of the application program is a copy generated for a first cluster of a container-based information processing system within which the application program is deployed; and
    utilizing the copy of the application program from the first cluster to deploy the application program in a second cluster of the container-based information processing system;
    wherein obtaining the copy of the application program further comprises:
       causing a metadata backup operation for the application program deployed in the first cluster to obtain a backup set of metadata; and
       halting operations associated with the application program deployed in the first cluster.

11. The method of claim 10, wherein obtaining the copy of the application program further comprises discovering containerized workloads and persistent volumes associated with the application program deployed in the first cluster.

12. The method of claim 11, wherein obtaining the copy of the application program further comprises causing generation of snapshots of the persistent volumes associated with the application program deployed in the first cluster.

13. The method of claim 12, wherein utilizing the copy of the application program from the first cluster to deploy the application program in the second cluster further comprises:
    creating, in the second cluster, a snapshot object for each snapshot of the generated snapshots; and
    creating, in the second cluster, a persistent volume claim for each snapshot of the generated snapshots.

14. The method of claim 13, wherein utilizing the copy of the application program from the first cluster to deploy the application program in the second cluster further comprises recovering the application program from the persistent volumes attached to corresponding ones of the containerized workloads in the second cluster to enable the application program to execute in the second cluster.

15. A computer program product comprising a non-transitory processor-readable storage medium having stored therein program code of one or more software programs, wherein the program code when executed by at least one processing platform causes the at least one processing platform to:
   obtain a copy of an application program, wherein the copy of the application program is a copy generated for a first cluster of a container-based information processing system within which the application program is deployed; and
   utilize the copy of the application program from the first cluster to deploy the application program in a second cluster of the container-based information processing system;
   wherein obtaining the copy of the application program further comprises:
      causing a metadata backup operation for the application program deployed in the first cluster to obtain a backup set of metadata; and
      halting operations associated with the application program deployed in the first cluster.

16. The computer program product of claim 15, wherein obtaining a copy of an application program further comprises:
   causing generation of snapshots of persistent volumes associated with the application program deployed in the first cluster; and
   un-halting the operations associated with the application program deployed in the first cluster.

17. The computer program product of claim 16, wherein utilizing the copy of the application program from the first cluster to deploy the application program in the second cluster further comprises recovering at least a portion of the backup set of metadata in the second cluster.

18. The computer program product of claim 17, wherein utilizing the copy of the application program from the first cluster to deploy the application program in the second cluster further comprises:
   creating, in the second cluster, a snapshot object for each snapshot of the generated snapshots;
   creating, in the second cluster, a persistent volume claim for each snapshot of the generated snapshots; and
   recovering the application program from the persistent volumes attached to corresponding ones of containerized workloads in the second cluster to enable the application program to execute in the second cluster.

19. The method of claim 12, wherein obtaining the copy of the application program further comprises un-halting the operations associated with the application program deployed in the first cluster.

20. The method of claim 19, wherein utilizing the copy of the application program from the first cluster to deploy the application program in the second cluster further comprises recovering at least a portion of the backup set of metadata in the second cluster.

\* \* \* \* \*